United States Patent [19]

Miyano

[11] Patent Number: 5,442,705
[45] Date of Patent: Aug. 15, 1995

[54] HARDWARE ARRANGEMENT FOR ENCIPHERING BIT BLOCKS WHILE RENEWING A KEY AT EACH ITERATION

[75] Inventor: Hiroshi Miyano, Tokyo, Japan

[73] Assignee: NEC Corporation, Tokyo, Japan

[21] Appl. No.: 208,589

[22] Filed: Mar. 11, 1994

[51] Int. Cl.$^6$ .............................................. H04L 9/06
[52] U.S. Cl. ........................................ 380/29; 380/44
[58] Field of Search .................................. 380/29, 44

[56] References Cited

U.S. PATENT DOCUMENTS

| | | | |
|---|---|---|---|
| 4,850,019 | 7/1989 | Shimizu et al. | 380/29 |
| 4,897,876 | 1/1990 | Davies | 380/44 X |
| 5,003,597 | 3/1991 | Merkle | 380/29 X |
| 5,222,139 | 6/1993 | Takaragi et al. | 380/44 X |
| 5,317,638 | 5/1994 | Kao et al. | 380/29 |

Primary Examiner—Gilberto Barron, Jr.
Attorney, Agent, or Firm—Sughrue, Mion, Zinn, Macpeak & Seas

[57] ABSTRACT

A plaintext is enciphered using a plurality of stages in tandem via a plurality of iterations. Each of the stages is arranged to perform a complex key-dependent computation. The stage includes a memory for storing a key. A cipher function circuit transposes, using the key, one block applied to the stage from a preceding stage. An exclusive-or circuit implements an exclusive-or operation of the output of the cipher function and the other block applied to the stage from the preceding stage. A unique arrangement is provided for transposing the output of the cipher function circuit and then applying the output thereof to the memory. Therefore, the key is replaced with the output of the unique arrangement.

6 Claims, 4 Drawing Sheets

HARDWARE ARRANGEMENT FOR ENCIPHERING BIT BLOCKS WHILE RENEWING A KEY AT EACH ITERATION

BACKGROUND OF THE INVENTION

1. Field of the Invention

The present invention relates generally to an arrangement for transforming plaintext into the corresponding ciphertext in a digital data communications system, and more specifically to an arrangement for enciphering data blocks via iterated computations wherein a key is renewed at each iteration. The arrangement disclosed is also applicable to the reverse process of transforming ciphertext into the original plaintext.

2. Description of the Related Art

In a data communications system, it is a common practice to use cryptographic techniques in order to prevent an unauthorized person(s) from obtaining data. Plaintext to be transmitted is transformed into the corresponding ciphertext. The plaintext can be reproduced from the ciphertext by using the exactly the same key used to encipher it.

A cipher is a secret method of writing whereby plaintext (or cleartext) is transformed into the corresponding ciphertext (sometimes called a cryptogram). The process is called encipherment or encryption, while the reverse process of transforming ciphertext into the corresponding plaintext is called decipherment or decryption. Both encipherment and decipherment are controlled by a cryptographic key or keys.

In 1977 the National Bureau of Standards of U.S.A. announced a Data Encryption Standard (DES) to be used in unclassified U.S. Government applications. DES enciphers 64-bit blocks of data with a 56-bit key.

By way of example, known cryptographic techniques utilizing DES are disclosed in Japanese Laid-open Patent Application Nos. 51-108701 and 51-108702 which were respectively based on U.S. Pat. application Nos. 552,684 and 552,685 both filed Feb. 24, 1975.

Further, DES is disclosed in detail in a paper entitled "Data Encryption Standard", Federal Information Processing Standards Publication (FIPS PUB) 46-1, Supersedes FIPS PUB 41, 1977 Jan. 15, Reaffirmed 1988 Jan. 22, published by U.S. Department of Commerce.

DES enciphers 64-bit blocks of data with a 56-bit key. The algorithm of DES, which is used both to encipher and decipher, is such that an input block is first transposed under an initial permutation IP. After has passed through 16 iterations of a cipher function, it is transposed under the inverse of the initial permutation to give a ciphertext.

The encipherment according to DES uses a common key which is prepared before encipherment and is fixed through encipherment. Accordingly, this algorithm has encountered the problem that the cipher is somewhat computationally vulnerable.

SUMMARY OF THE INVENTION

It is an object of the present invention to provide a hardware arrangement for enciphering blocks of data, via a plurality of iterations, using a key which is renewed each iteration.

More specifically, an aspect of the present invention resides in a hardware arrangement for transforming plaintext into corresponding ciphertext using a first to n-th stages provided in tandem (where n is an integer more than three), each of said first to n-th stages performing a complex key-dependent computation and comprising; a memory for storing a key; first means for transposing, using said key, a first bit block applied thereto from a preceding stage; second means for implementing an exclusive-or operation of output of said first means and a second bit block applied thereto from said preceding stage; and third means for transposing output of said first means using said key, said third means applying output thereof to said memory whereby said key is replaced with said output of said third means.

Another aspect of the present invention resides in a hardware arrangement for transforming plaintext into corresponding ciphertext using a first to n-th stages provided in tandem (where n is an integer more than three), each of said first to n-th stages performing a complex key-dependent computation and comprising; a memory for storing a key; first means storing a plurality of first bit blocks successively applied thereto from a preceding stage, said second means receiving said key from said memory and modifying said key using at least one of said first bit blocks stored, said second means outputting a modified key; second means for transposing, using said modified key, the first bit block applied thereto from the preceding stage; and third means for implementing an exclusive-or operation of output of said second means and a second bit block applied thereto from said preceding stage.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

The present invention will be discussed in connection with the case where it is applied to the Data Encryption Standard (DES). However, the application of the present invention to DES is merely exemplary and the present invention is in no way limited to such an application if a common key is used to encipher a plaintext via iterations.

Figure 1:
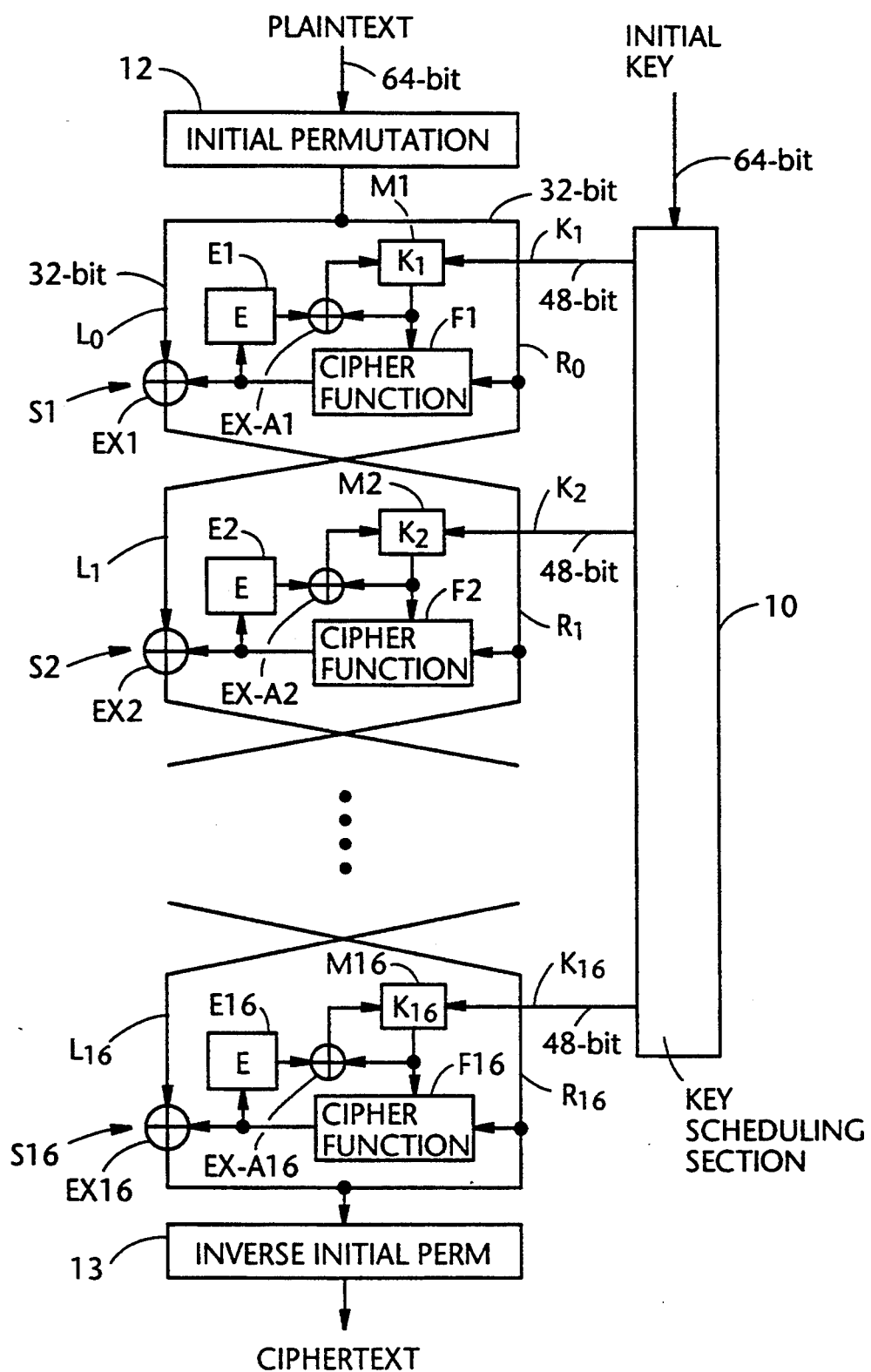
FIG. 1 is a block diagram schematically showing a first embodiment of the present invention.

FIG. 1 is a block diagram schematically showing the first embodiment of the present invention.

The first embodiment features that a cryptographic key, which controls each of the complex key-dependent computation stages S1–S16, is renewed after completing a bit transposition thereat.

The first embodiment differs from the arrangement of DES in that each of the complex key-dependent computation stage S1–S16 of the first embodiment, is additionally provided with three components Mn, En and EX-An (n=1, 2, ..., 16).

A key scheduling section 10 is supplied with a 64-bit initial key including 8 parity bits. The initial key applied to the key scheduling section 10 is first subjected to bit transposition using a permutation PC-1 (permuted choice) shown in Table 1. The table, as well as the other permutation tables described later, should be read left-to-right, top-to-bottom. For example, the permutation PC-1 transposes $B = b_1, b_2, \ldots, b_{64}$ into $B_p = b_{57}, b_{49}, \ldots, b_4$.

TABLE 1

| 57 | 49 | 41 | 33 | 25 | 17 | 9 |
|----|----|----|----|----|----|----|
| 1 | 58 | 50 | 42 | 34 | 26 | 18 |
| 10 | 2 | 59 | 51 | 43 | 35 | 27 |
| 19 | 11 | 3 | 60 | 52 | 44 | 36 |
| 63 | 55 | 47 | 39 | 31 | 23 | 15 |
| 7 | 62 | 54 | 46 | 38 | 30 | 22 |
| 14 | 6 | 61 | 53 | 45 | 37 | 29 |
| 21 | 13 | 5 | 28 | 20 | 12 | 4 |

The permutation PC-1 discards the parity bits and transpose the remaining 56 bits as shown in the above Table 1. The result of the permutation PC-1 is then split into two halves C and D of 28 bits each. The blocks C and D are then successively circularly shifted left to derive each key $K_n$ (suffix n denotes n-th iteration and $n = 1, 2, \ldots, 16$ in this case). The key schedule of left shifts is shown in Table 2.

TABLE 2

| Iteration i | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Number of Shifts | 1 | 1 | 2 | 2 | 2 | 2 | 2 | 2 | 1 | 2 | 2 | 2 | 2 | 2 | 2 | 1 |

Bit data Cn and Dn ($n = 1, 2, \ldots, 16$) obtained through the left circular shifts, are then decreased in number from 56 bits to 48 bits via permutation PC-2 shown in Table 3.

TABLE 3

| 14 | 17 | 11 | 24 | 1 | 5 |
|----|----|----|----|----|----|
| 3 | 28 | 15 | 6 | 21 | 10 |
| 23 | 19 | 12 | 4 | 26 | 8 |
| 16 | 7 | 27 | 20 | 13 | 2 |
| 41 | 52 | 31 | 37 | 47 | 55 |
| 30 | 40 | 51 | 45 | 33 | 48 |
| 44 | 49 | 39 | 56 | 34 | 53 |
| 46 | 42 | 50 | 36 | 29 | 32 |

The operation of the key scheduling section 10 is well known in the art and hence further descriptions will be omitted for the sake of brevity.

The 16 keys $K_1$–$K_{16}$ thus obtained are respectively applied to the stages S1–S16 and stored in corresponding memories M1–M16.

As shown in FIG. 1, the stage S1 includes, in addition to the memory M1, a cipher function circuit F1, expanding permutation circuit E1 and an exclusive-or gate EX1 and EX-A1. The other stages S2–S16 each is configured in exactly the same manner as the stage S1 and thus, each of the counterparts is given the same notation plus an iteration number.

After the stages S1–16 have respectively stored the keys $K_1$–$K_{16}$, an initial 64-bit block of a plaintext is applied to the arrangement of FIG. 1 and then first subjected to an initial permutation IP (Table 4) at a circuit 12.

TABLE 4

| 58 | 50 | 42 | 34 | 26 | 18 | 10 | 2 |
|----|----|----|----|----|----|----|---|
| 60 | 52 | 44 | 36 | 28 | 20 | 12 | 4 |
| 62 | 54 | 46 | 38 | 30 | 22 | 14 | 6 |
| 64 | 56 | 48 | 40 | 32 | 24 | 16 | 8 |
| 57 | 49 | 41 | 33 | 25 | 17 | 9 | 1 |
| 59 | 51 | 43 | 35 | 27 | 19 | 11 | 3 |
| 61 | 53 | 45 | 37 | 29 | 21 | 13 | 5 |

TABLE 4-continued

| 63 | 55 | 47 | 39 | 31 | 23 | 15 | 7 |
|----|----|----|----|----|----|----|---|

After the initial block input of 64-bit is transposed under the initial permutation IP, the 64-bit block is divided into two halves L and R of 32-bit each and then undergo 16 iterations of a cipher function f and exclusive-or operations. Let $T_n$ (64 bits) denote the result of the n-th iteration, and let $L_n$ and $R_n$ (each 32 bits) denote the left and right haves of $T_n$, respectively. Then, $$L_n = R_{n-1}$$

$$R_n = L_{n-1} + f(R_{n-1}, K_n)$$

where + depicts the exclusive-or operation.

Figure 2:
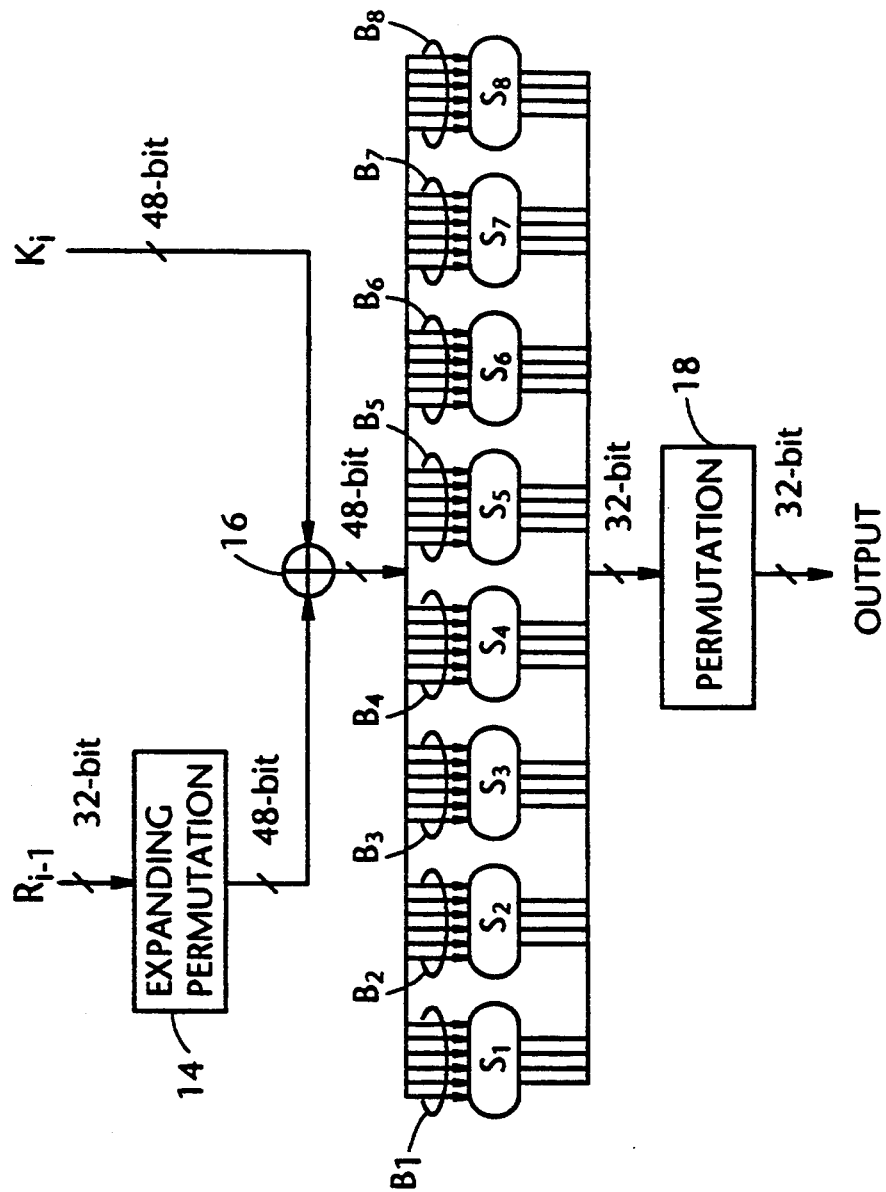
FIG. 2 is a block diagram schematically showing one block of FIG. 1.

FIG. 2 is a sketch of the hardware arrangement implementing the cipher function $f(R_{n-1}, K_n)$. $R_{n-1}$ is first expanded to a 48-bit block, at a bit expanding circuit 14, using a bit selection table (Table 5).

TABLE 5

| 32 | 1 | 2 | 3 | 4 | 5 |
|----|---|---|---|---|---|
| 4 | 5 | 6 | 7 | 8 | 9 |
| 8 | 9 | 10 | 11 | 12 | 13 |
| 12 | 13 | 14 | 15 | 16 | 17 |
| 16 | 17 | 18 | 19 | 20 | 21 |
| 20 | 21 | 22 | 23 | 24 | 25 |
| 24 | 25 | 26 | 27 | 28 | 29 |
| 28 | 29 | 30 | 31 | 32 | 1 |

Subsequently, the exclusive-or of $E(R_{n-1})$ (viz., the output of the expanding permutation circuit 14) and $K_n$ is implemented at the exclusive-or gate 16 and the result broken into eight 6-bit blocks $B_1, \ldots, B_8$ which are respectively applied to eight selection (substitution) function circuits (S-boxes) $S_1, \ldots, S_8$. These eight S-boxes circuits $S_1$–$S_8$ output respectively 4-bit blocks which are concatenated together, and the resulting 32-bit block is transposed by a permutation circuit 18 using Table 6.

The operations of S-boxes $S_1$–$S_8$ are well known and disclosed in detail in the paper referred to in the opening paragraphs and hence will be omitted for the purpose of simplifying the disclosure.

TABLE 6

| 16 | 7 | 20 | 21 |
|----|---|----|----|
| 29 | 12 | 28 | 17 |
| 1 | 15 | 23 | 26 |
| 5 | 18 | 31 | 10 |
| 2 | 8 | 24 | 14 |
| 32 | 27 | 3 | 9 |
| 19 | 13 | 30 | 6 |
| 22 | 11 | 4 | 25 |

In the following, merely for the convenience of description, the operations of the n-th stage Sn ($n = 1, 2, \ldots, 16$) are discussed.

The 32-bit block outputted from the cipher function circuit Fn is applied to the EXn to which the bit block $L_n$ is also applied. The EXn carries out an exclusive-or operation of the 32-bit block from Fn and the block $L_n$, and the result of the operation is applied to the next stage S(n+1) as a block $R_{i+1}$.

As mentioned above, the first embodiment is to renew the key $K_n$ (n=1, 2, ..., 16) after each transposition of data block at the corresponding stage Sn. To this end, the memory Mn, the expanding permutation circuit En and the exclusive-or circuit EX-An are provided in the stage Sn.

The 32-bit block from the function circuit Fn is expanded to a 48-bit block using the above mentioned Table 5. Following this, the EX-An performs an exclusive-or operation of the 48-bit key $K_n$ and the 48-bit block outputted from En. Let the key $K_n$ currently stored in the memory Mn denote $K_{old}$ and let a new key denote $K_{new}$, we have $$K_{new} = K_{old} + E(O)n$$

wherein E(O)n depicts the output of the exclusive-or circuit EX-An.

Thus, the key $K_n$ (i=1, 2, ..., 16) stored in the corresponding memory Mn can be renewed or replaced after each transposition of data block at the corresponding stage Sn is finished.

The data block outputted from the last stage S16 is subjected to the inverse of the initial permutation using Table 7. Thus, a ciphertext can be obtained from the arrangement of FIG. 1.

TABLE 7

| 40 | 8 | 48 | 16 | 56 | 24 | 64 | 32 |
|---|---|---|---|---|---|---|---|
| 39 | 7 | 47 | 15 | 55 | 23 | 63 | 31 |
| 38 | 6 | 46 | 14 | 54 | 22 | 62 | 30 |
| 37 | 5 | 45 | 13 | 53 | 21 | 61 | 29 |
| 36 | 4 | 44 | 12 | 52 | 20 | 60 | 28 |
| 35 | 3 | 43 | 11 | 51 | 19 | 59 | 27 |
| 34 | 2 | 42 | 10 | 50 | 18 | 58 | 26 |
| 33 | 1 | 41 | 9 | 49 | 17 | 57 | 25 |

As mentioned above, the key in each of the stages S1–S16 is subject to change after each iteration. Accordingly, the ciphertext obtained from the first embodiment is computationally much more infeasible to be broken as compared with the prior art.

Figure 3:
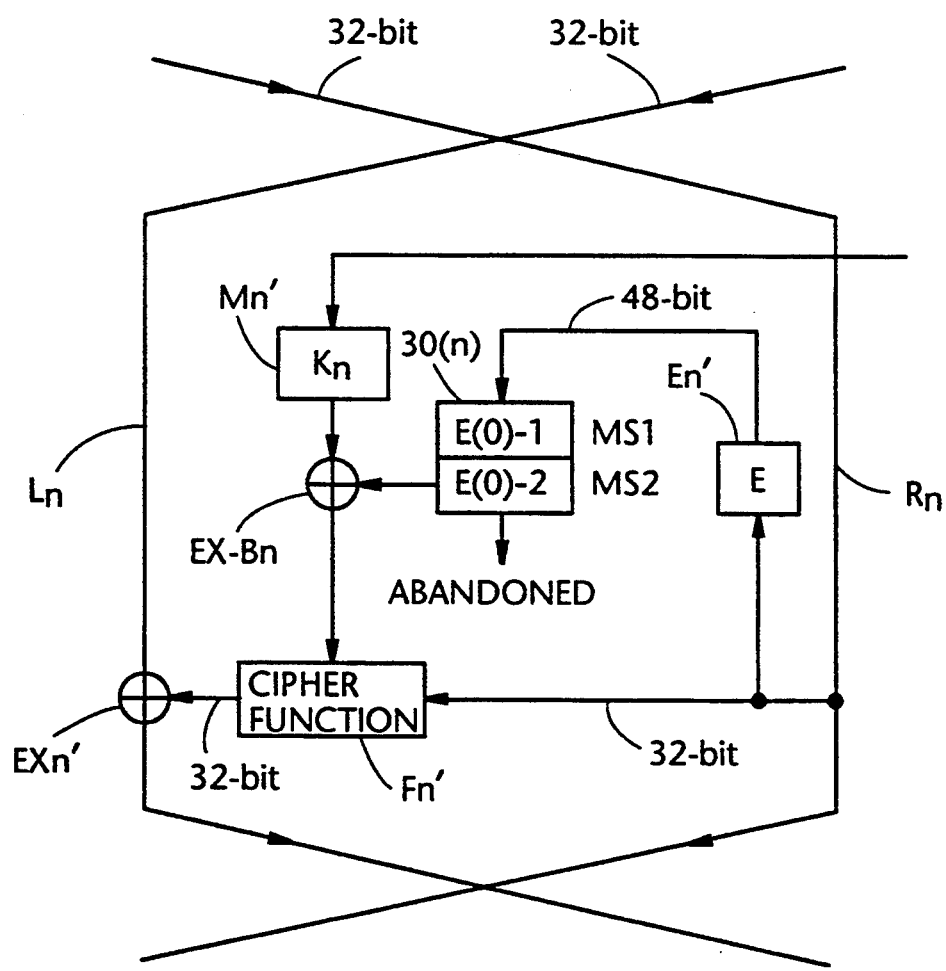
FIG. 3 is a second embodiment of the present invention.

A second embodiment of the present invention will be discussed with reference to FIG. 3. The second embodiment is applied to DEC as in the first embodiment merely by way of example. FIG. 3 shows only one stage (viz., n-th stage (n=1, 2, ..., or 16)) in that each of the other fifteen stages is arranged or configured in exactly the same manner as the n-th stage.

The n-th stage Sn includes a memory Mn', two exclusive-or circuits EXn' and EX-Bn, a cipher function circuit Fn', an expanding permutation circuit En', and a memory 30(n), all of which are coupled as shown. The cipher function Fn' and the exclusive-or circuit EXn' are essentially the same as the counterparts Fn and Exn of FIG. 1. Further, the memory Mn' corresponds to Mn of FIG. 1, and the expanding permutation circuit En' operates in a manner identical to the counterpart En of FIG. 1.

In the second embodiment, the key $K_n$ initially outputted from the key scheduling section 10 (FIG. 1) is retained in the memory Mn' and is not subjected to any renewal as in the first embodiment.

The second embodiment is advantageous especially in the case where the ciphertext is subject to bit errors during encipherment and/or during data transmission. In more specific terms, the key $K_n$ initially applied is held in the memory Mn' and hence, even if a bit error occurs at a given stage and/or during data transmission, the bit disturbance caused by the bit error can be restored in a very short time.

The memory 30(n) includes two memory stages MS1 and MS2 in this particular embodiment. The upper memory stage MS1 stores the bit block E(O)-1 applied thereto from the expanding permutation circuit En' at a given iteration. When the bit block E(O)-1 is stored in the memory stage MS1, the bit block which has been stored therein is transferred to the lower memory stage MS2. The bit transposition operation is controlled by the output (viz., key) of the exclusive-or circuit EX-Bn which is supplied with the key $K_n$ and the previous output E(O)-2 of the expanding permutation circuit En'.

At the next iterated operation, the new bit block is stored in the memory stage MS1 as a new bit block E(O)-1. Thus, the old bit block E(O)-1 is transferred to the memory stage MS2 as a new bit block E(O)-2. The old bit block E(O)-2 is abandoned. Following this, the same operation is repeated.

The operations of the circuits Fn' and EXn' have been discussed in connection with the first embodiment and as such, further descriptions thereof will be omitted.

In FIG. 3, the memory 30(n) includes two memory stages MS1 and MS2 in this particular case. However, the memory stages can be increased wherein the output of the circuit En' stored in the last stage is applied to the exclusive-or circuit EX-Bn.

A third embodiment of the present invention will be discussed with reference to FIG. 4. The third embodiment includes a memory 30(n)' having three memory stages MS1, MS2 and MS3. Other than this, the third embodiment is the same as the second embodiment.

Figure 4:
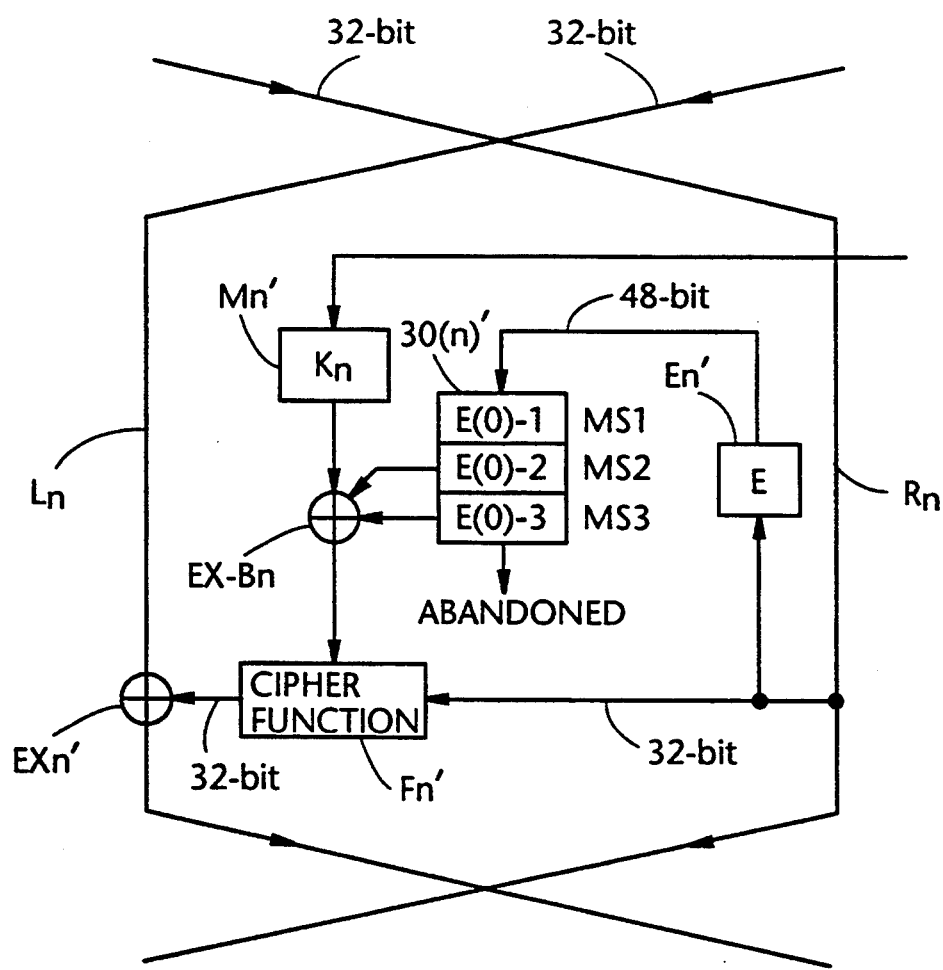
FIG. 4 is a block diagram schematically showing a third embodiment of the present invention.

As shown in FIG. 4, the exclusive-or circuit EX-Bn is supplied with the three inputs from the memory Mn' and the memory stages MS2 and MS3. According to the third embodiment, a key applied to the cipher function circuit Fn' can be changed in a manner which renders more computationally infeasible to break the cipher as compared with the second embodiment.

It will be understood that the above disclosure is representative of several possible embodiments of the present invention and that the concept on which the invention is based is not specifically limited thereto.

What is claimed is:

1. A hardware arrangement for transforming plaintext into corresponding ciphertext using a first to n-th stages provided in tandem (where n is an integer more than three), each of said first to n-th stages performing a complex key-dependent computation and comprising;

a memory for storing a key;

first means for transposing, using said key, a first bit block applied thereto from a preceding stage;

second means for implementing an exclusive-or operation of output of said first means and a second bit block applied thereto from said preceding stage; and third means for transposing output of said first means using said key, said third means applying output thereof to said memory whereby said key is replaced with said output of said third means.

2. A hardware arrangement as claimed in claim 1, wherein said third means includes:

fourth means, coupled to said first means, for transposing the output of said first means; and fifth means, coupled to said memory and said fourth means, for implementing an exclusive-or operation of said key and said output of said fourth means.

3. A hardware arrangement as claimed in claim 1, wherein said plaintext is applied to said first stage after being subjected to an initial permutation, and wherein output of said n-th stage is subjected to the inverse of said initial permutation for obtaining said ciphertext.

4. A hardware arrangement for transforming plaintext into corresponding ciphertext using a first to n-th stages provided in tandem (where n is an integer more than three), each of said first to n-th stages performing a complex key-dependent computation and comprising;

a memory for storing a key;

first means storing a plurality of first bit blocks successively applied thereto from a preceding stage, said first means receiving said key from said memory and modifying said key using at least one of said first bit blocks stored, said first means outputting a modified key;

second means for transposing, using said modified key, the first bit block applied thereto from the preceding stage; and third means for implementing an exclusive-or operation of output of said second means and a second bit block applied thereto from said preceding stage.

5. A hardware arrangement as claimed in claim 4, wherein said first means includes:

fourth means for transposing said first bit blocks applied thereto;

fifth means, coupled to said fourth means, for storing outputs of said fourth means; and sixth means for implementing an exclusive-or operation of said key and at least one of said first bit blocks stored in said fifth means.

6. A hardware arrangement as claimed in claim 1, wherein said plaintext is applied to said first stage after being subjected to an initial permutation, and wherein output of said n-th stage is subjected to the inverse of said initial permutation for obtaining said ciphertext.

* * * * *

UNITED STATES PATENT AND TRADEMARK OFFICE
CERTIFICATE OF CORRECTION

PATENT NO. : 5,442,705
DATED : August 15, 1995
INVENTOR(S) : Hiroshi MIYANO

It is certified that error(s) appears in the above-identified patent and that said Letters Patent is hereby corrected as shown below:

Title page, item [30],
Please insert priority data

--Foreign Application Priority Data
    March 11, 1993 [JP]    Japan..................5-050276--.

Col. 4, line 11, delete "haves" and insert --halves--.

Signed and Sealed this

Twelfth Day of March, 1996

Attest:

BRUCE LEHMAN

*Attesting Officer*    Commissioner of Patents and Trademarks